Inventor:
FRANZ SCHREIBER
BY Dicke & Craig
ATTORNEYS

Nov. 4, 1969

F. SCHREIBER 3,476,896

SWITCH, ESPECIALLY FOR STEERING COLUMN
SWITCHES IN MOTOR VEHICLES

Filed May 16, 1966

Inventor:
FRANZ SCHREIBER

BY Dicke + Craig

ATTORNEYS

Nov. 4, 1969

F. SCHREIBER 3,476,896

SWITCH, ESPECIALLY FOR STEERING COLUMN
SWITCHES IN MOTOR VEHICLES

Filed May 16, 1966

Inventor:
FRANZ SCHREIBER
BY Dicke + Craig
ATTORNEYS

United States Patent Office 3,476,896
Patented Nov. 4, 1969

3,476,896
SWITCH, ESPECIALLY FOR STEERING COLUMN SWITCHES IN MOTOR VEHICLES
Franz Schreiber, Kirchheim (Neckar), Germany, assignor to SWF-Spezialfabrik fur Autozubehor Gustav Rau GmbH, Bietigheim, Wurttemberg, Germany
Filed May 16, 1966, Ser. No. 550,363
Claims priority, application Germany, May 24, 1965, S 97,255; June 26, 1965, S 97,856
Int. Cl. H01h 9/54
U.S. Cl. 200—61.54                  33 Claims

ABSTRACT OF THE DISCLOSURE

A switch of the type having a rotatable cam for actuating one or more switch contacts between their open and closed position with the cam being actuated by a movable member, wherein the movable member at the same time is integrally provided with an elastic art for resiliently holding the cam in any of its actuated positions and provided with a nose portion for directly operating additional contacts. Preferably, the movable member is constructed homogeneously of a synthetic plastic.

BACKGROUND OF THE INVENTION

A switch structure of this type is already known in the prior art and is built into a separate steering column switch. Separate metal leaf springs, constructed in this prior art embodiment as push button, are provided in the switch part for the actuation of the optical signal, which metal leaf springs serve for switching and securing or holding in position two cams arranged perpendicularly with respect to each other which actuate alternately two contacts. With this prior art construction, the installation of the leaf spring into the push button has to be carried out with very great care because a readjustment after the assembly of the switch is no longer possible. Furthermore, the tolerances conditioned by the series manufacture are effective in an unfavorable manner with this prior art construction.

SUMMARY OF THE INVENTION

The aim of the present invention is an improved construction of the switch parts and such an arrangement thereof that an adjustment is possible prior to the installation of the switch into the steering column housing.

The underlying problems are solved in accordance with the present invention in that the switch part arranged at the inner end of the actuating lever and the springy switch elements as well as a switching projection or nose portion are made in one piece of an elastic material, preferably of synthetic plastic material from the group of polyamides. The switch elements are thereby constructed in a leaf spring-like manner as thin webs which are arranged parallel to each other and extend in mutually opposite directions, and whose elastic free leg portions extend in the direction of movement of the switch part which is pivotally supported with its upper end at the switch housing. The lower switch arm is provided with a pawl-shaped stop or abutment. The distance of the upper retainer arm to the switch arm is equal to or smaller than the outer dimension of the switching cam of square shape. Furthermore, a web-shaped switching projection or nose portion is arranged in accordance with the present invention perpendicularly to the switch arm which projection or nose portion actuates an additional contact, which in turn closes briefly the current feed circuit for the main headlight, corresponding to the actuation of the switch lever, for the purpose of optically signalling also when the dimmed headlights are not engaged or turned on. This contact is connected in an additional current feed circuit which is not connected with the normal on-and-off switch of the light system so that also with turned-off dimmed headlights, the optical signal can be actuated.

According to a feature and development of the present invention, still only a single S-shaped elastic switch arm is provided in the place of the switch arm and the retainer arm at the switch part.

This S-shaped switch is so arranged at the switch part that upon pivoting movement of the switch part, it shifts the switch cam through 90° with each switch stroke and at the same time secures or retains the switch cam in its position when the switch part is pivoted back into its initial position.

For this purpose, the elastic free leg portion rests under pre-stress on a respective longitudinal surface of the switch cam.

The end of the free leg portion is provided with a pawl-shaped extension and a switching nose portion or projection whereby the switch part and the switch arm are made in one piece together with the pawl-shaped extension and the switching nose portion or projection, preferably of synthetic plastic material of the polyamide class.

Furthermore, the abutment surface of the pawl-shaped extension disposed parallely to the switching cam at the free end of the switch arm is, according to the present invention, approximately as long as a surface of the switching cam whereby the height of the switching surface of the pawl is relatively slight in relation to the length of the abutment surface.

A further improvement as regards adjustment and installation of the switch is achieved by this construction and design of the switch parts in accordance with the present invention.

For purposes of improved assembly and adjustment of the switch parts cooperating with the switching part, such as contacts and control cams, the latter are secured and adjusted on a base plate prior to installation into the steering column housing.

Accordingly, it is an object of the present invention to provide a switch of the type described above which eliminates by simple means the aforementioned shortcomings and drawbacks encountered with the prior art constructions.

Another object of the present invention resides in a switch assembly of the type described above which eliminates the necessity for extremely careful assembly and installation.

A further object of the present invention resides in a switch assembly of the type described above which reduces the requirements as to tolerances for mass production.

A still further object of the present invention resides in a steering column switch assembly of the type described above which makes possible the accurate adjustment of the various switch parts prior to assembly thereof into the steering column housing.

A further object of the present invention resides in a steering column switch assembly which permits appropriate sub-assembly of the switch parts to facilitate adjustment for proper operation thereof.

Still another object of the present invention resides in a switch assembly for steering column switches in motor vehicles in which the main headlights may be selectively energized for the purpose of optically signalling regardless of the setting of the light switch in the vehicle.

BRIEF DESCRIPTION OF THE DRAWING

These and other objects, features, and advantages of the present invention will become more obvious from the following descrpition when taken in connection with the accompanying drawing which shows, for purposes of illustration only, two embodiments in accordance with the present invention, and wherein.

DETAILED DESCRIPTION OF THE DRAWINGS

Figure 1:
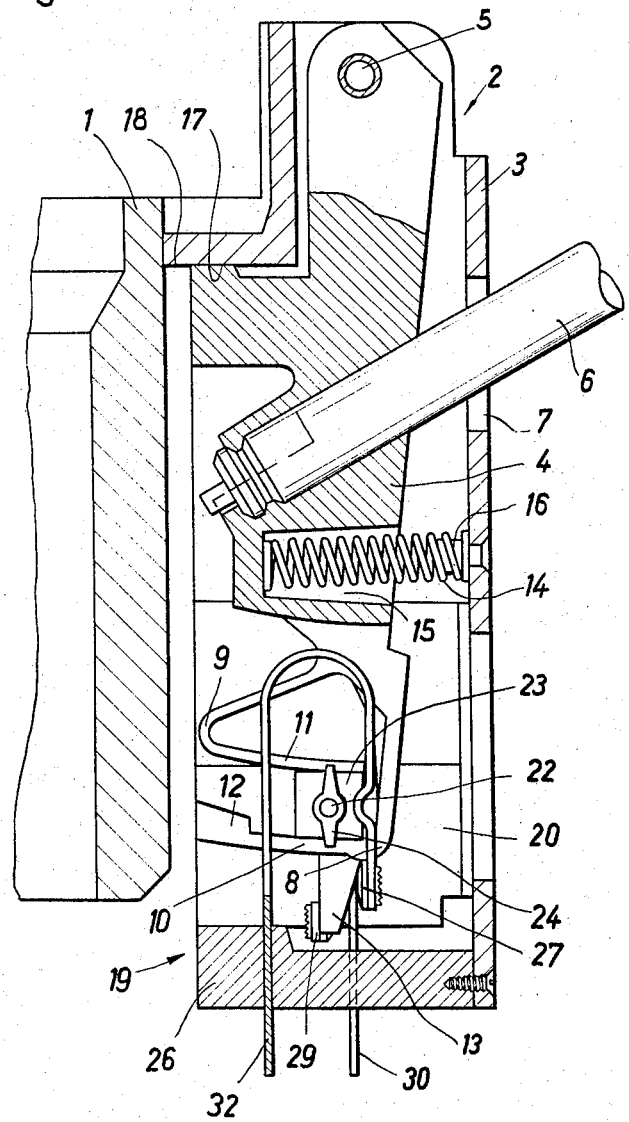
FIGURE 1 is a longitudinal cross-sectional view through a steering column switch assembly in accordance with the present invention.
Figure 2:
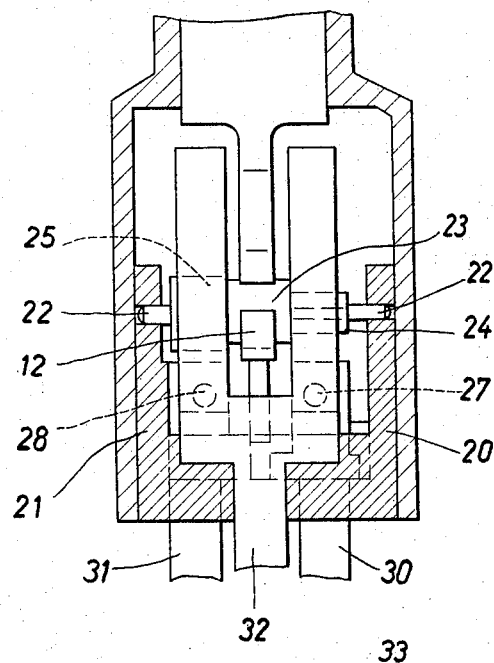
FIGURE 2 is a front elevational view, partly in cross section, of the switch assembly of FIGURE 1.
Figure 3:
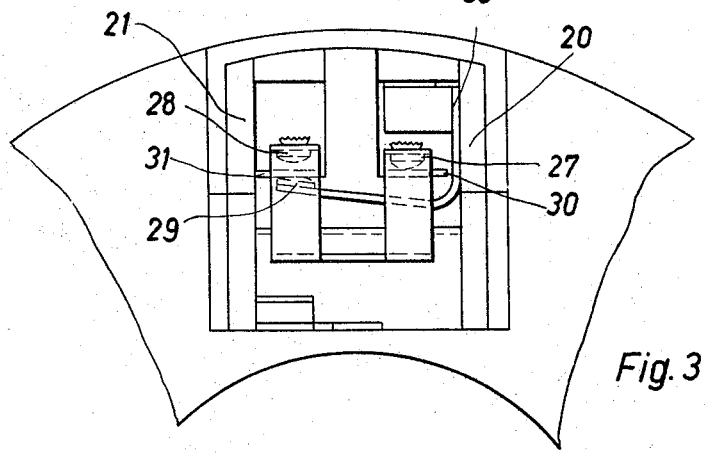
FIGURE 3 is a plan view of the switch assembly of FIGURES 1 and 2, illustrating an intermediate position of the contact arrangement during switching from main to dimmed headlights, or vice versa.

Referring now to the drawing wherein like reference numerals are used throughout the various views to designate like parts and more particularly to FIGURES 1 to 3, a switch assembly generally designated by reference numeral 2 is arranged at the steering column housing 1 of a motor vehicle. A switch part 4 is pivotally supported about a horizontal pin or shaft 5 within the housing 3 of the switch assembly 2.

An actuating lever 6 is secured approximately in the center of the switch part 4 which lever 6 is guided through an aperture 7 of the housing 3 and extends with its free end approximately to the steering wheel rim (not shown). Two leaf spring-like web portions are formed onto the lower end of the switch part 4 which are designated as switch arm 8 and as securing or retainer arm 9, and whose leg portions 10 and 11 are arranged elastically and extending mutually opposite one another as well as generally in the direction of movement of the switch part 4.

The end 12 of the switch arm 8 is constructed in a pawl-shaped manner. A switching projection or nose portion 13 is provided extending perpendicularly to the springy free leg portion 10 of the switch arm 8.

A compression spring 14 is retained at the switch part 4 within a dead-end bore 15 and at the housing 3 by means of a bolt 16. The spring 14 presses the switch part 4 together with the edge 17 thereof serving as abutment against a counter-abutment surface 18 provided at the switch housing 3 (FIG. 1).

A U-shaped assembly plate generally designated by reference numeral 19 is provided in the lower part of the switch assembly housing 3. A shaft 22 is rotatably supported between oppositely disposed walls 20 and 21 of the U-shaped assembly plate 19. The switching cam 23 and the control cams 24 and 25 disposed on both sides of the cam 23 and displaced with respect to each other by 90° are securely mounted on the shaft 22 to rotate in unison therewith.

Contacts 27 and 28 for the main headlights and the dimmed headlights as well as an additional contact 29 are arranged in the base plate 26 of the assembly plate 19. The contact 29 is provided with a separate current supply lead 33 for the purpose of an optical intermittently operable or blinker-type signal which current supply lead 33 is not connected with the normal on-and-off switch.

Contact strips 30 and 31 are coordinated to the contacts 27 and 28. The contact 29 which cooperates with the switching nose portion or projection 13 is coordinated to the contact strip 30 for the main headlight. The current supply lead for the contacts 27 and 28 is designated by reference numeral 32.

OPERATION

The operation of the switch assembly described hereinabove is as follows:

During movement of the actuating lever 6 through a full stroke in the upward direction, the switch part 4 is pivoted against the force of the spring 14 in the counter-clockwise direction. The pawl-shaped end 12 of the switch arm 8 thereby seizes the lower edge of the switching cam 23 and rotates the same through 90° whereby the switch arm 8 and the securing or retainer arm 9 deflect elastically in the downward and upward direction, respectively. During return pivotal movement of the switch part 4, the retainer arm 9 rests with its springy leg portions 11 on a flat surface of the switching cam 23 and prevents that the latter rotates back.

During the rotation of the switching cam 23, the control cams 24 and 25 connected therewith actuate alternately the contacts 27 and 28.

During the next switching stroke, the contact 28 for the dimmed lights is opened and the contact 27 for the main headlights is closed.

If the switch lever 6 is moved only through half a stroke, then the pawl 12 comes to a standstill in front of the switching cam 23 and does not actuate the same. However, the contact 29 elastically abutting against the switching nose portion or projection 13, comes into abutment at the contact strip 30 for the main headlights by the back pivoting of the nose portion 13 so that the main headlights are now turned on.

Upon release of the switching lever 6, the nose portion 13 again lifts the contact 29 off from the contact strip 30.

All of the contact parts as well as switching and control cams are arranged on the assembly plate 19 and can be adjusted prior to the installation into the switch assembly housing.

The switch part 4 according to the present invention can also be controlled electromagnetically and more particularly by means of a conventional relay.

Figure 4:
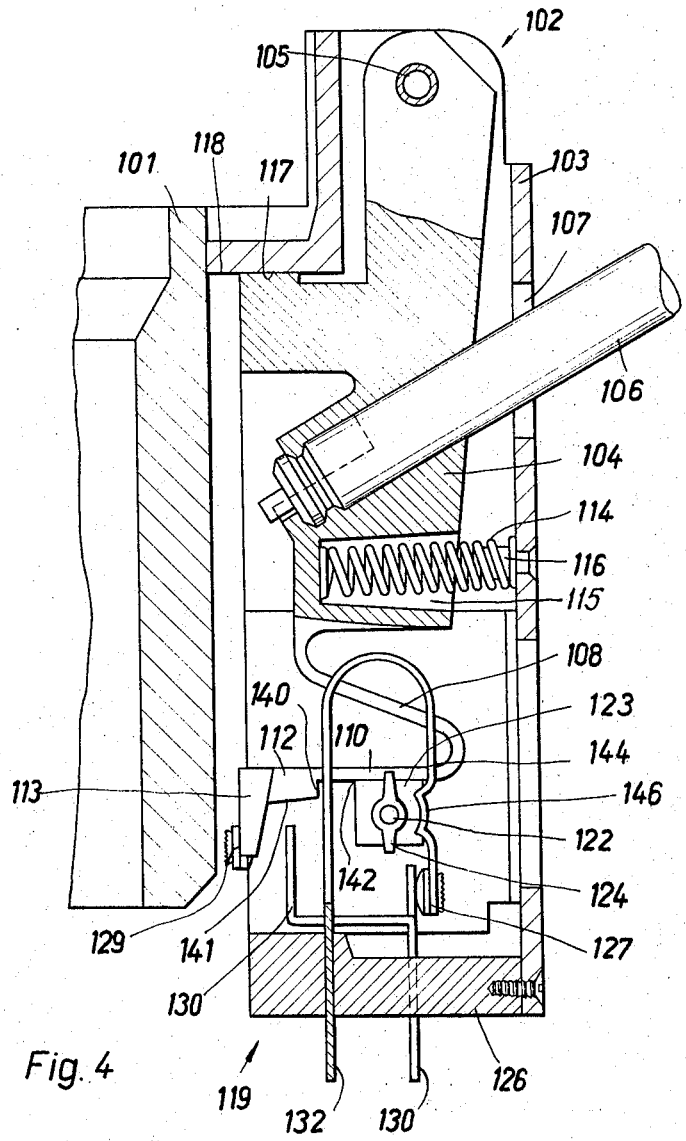
FIGURE 4 is a longitudinal cross-sectional view through a modified embodiment of a steering column switch assembly in accordance with the present invention.
Figure 5:
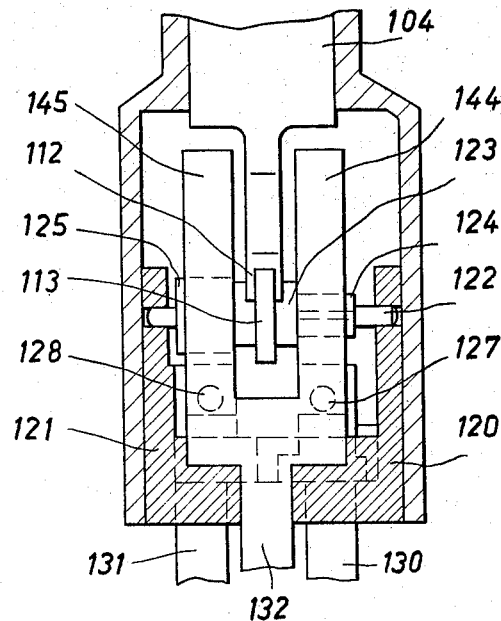
FIGURE 5 is a front elevational view, partly in cross section, of the steering column switch assembly of FIGURE 4.
Figure 6:
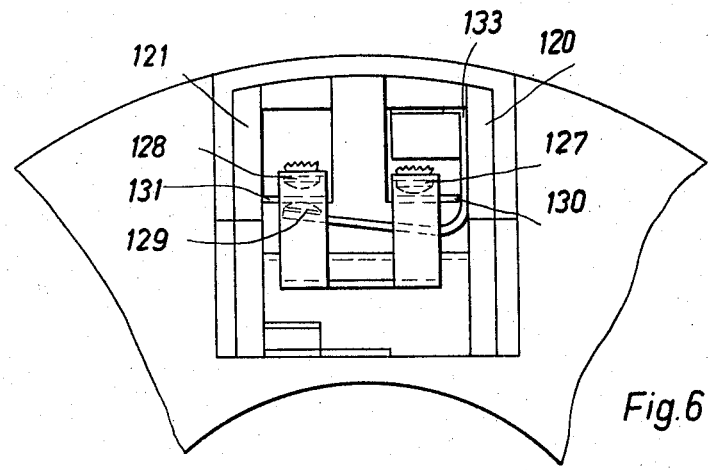
FIGURE 6 is a plan view of the switch assembly of FIGURES 4 and 5, illustrating an intermediate position of the contact arrangement while switching from main to dimmed headlights or vice versa.

According to the embodiment of FIGURES 4 to 6 in which similar parts are again designated by the same reference numerals though of the 100 series, a switch assembly generally designated by reference numeral 102 is again arranged at the steering column housing 101 of a motor vehicle. A switch part 104 is pivotally supported about a horizontal shaft 105 within the housing 103 of the switch assembly 102. An actuating lever 106 is secured approximately in the center of the switch part 104 which lever is guided through an aperture 107 of the housing 103 and extends with its free end approximately up to the steering wheel rim (not shown). An S-shaped switch arm 108 is formed onto the lower end of the switch part 104. The free elastic leg portion 110 of the S-shaped switch arm 108 is provided at its end with a pawl-shaped extension 112 and with a web-like switching nose portion 113. The pawl-shaped extension 112 has a relatively low switching surface 140, i.e., of relatively slight depth, and an abutment surface 141 corresponding approximately to the length of the edge of the switching cam 123.

A compression spring 114 is retained at the switch part 104 within a dead-end bore 115 and at the housing 103 by a bolt 116. The spring 114 presses the switch part 104 together with the edge 117 serving as abutment against a counter-abutment surface 118 at the switch housing 103.

A U-shaped assembly plate generally designated by reference numeral 119 is provided in the lower part of the switch assembly housing 103. A shaft 122 is rotatably supported between the oppositely disposed walls 120 and 121 of the assembled plate 119. The switching cam 123 as well as the control cams 124 and 125 disposed on both sides of the switching cam 123 and mutually displaced by 90° are securely mounted on the shaft 122 for rotation in unison therewith.

Contacts 127 and 128 for the main and dimmed headlights as well as an additional contact 129 are arranged in the base plate 126 of the assembly plate 119. The contact 129 is provided with a separate current feed lead 133 for the purpose of an optical intermittently operable or blinker-type signal which feed lead is not connected with the normal on-and-off switch.

The contact strips 130 and 131 are coordinated to the Contacts 127 and 128. The contact 129 which cooperates with the switching nose portion 113 is coordinated to the contact strip 130 for the main headlights. Reference numeral 132 designates the current supply lead for the contacts 127 and 128.

OPERATION

The operation of the embodiment described in connection with FIGURES 4 and 6 is as follows:

During movement of the actuating lever 106 through a full stroke in the upward direction, the switch part 104 is pivoted in the counter-clockwise direction against the force of the spring 114. The pawl-shaped extension 112 of the switch arm 108 thereby seizes with its switching surface 140 the forward edge 142 of the switching cam 123 and rotates the latter through 90° so that the control cams 124 and 125 connected with the switching cam 123 alternately actuate the contacts 127 and 128. After a rotation through approximately 45° on the part of the switching cam 123, the free end of the switch arm 108 rests on the edge 142 of the switching cam 123. In this position of the switch parts, the S-shaped switch arm 108 is compressed to its smallest height so that it represents a force storage means. If the switching cam 123 now moves further by entrainment from the pawl, until the edge 142 lies behind the center axis of the shaft 122, then the remainder of the rotation of the switching cam 123 is effected by the stored spring force of the switching arm 108. The abutment surface 141 thereby abuts against a longitudinal surface of the switching cam 123 and holds the same securely in its position.

Upon releasing of the actuating lever 106, the pawl 112 slides with its abutment surface 141 off the switching cam 123. The switching cam 123 thereby carries out a small tilting movement corresponding to the height of the switching surface 140 before it comes into abutment at the elastic free leg portion 110 of the switching arm 108 and is retained or secured in this position.

In order to maintain constant, during this tilting movement, the distance of the contacts 127 and 128 from the contact strips 130 and 131, the current supply leads 144 and 145 for the contacts 127 and 128 are provided with raised portions 146 and 147 facing the control cams 124 and 125, respectively, which raised portions have within the contact area of the control cams 124 and 125 a flat or concave shape. As a result of this measure, the last pivot movement of the control cams 124 and 125 during the sliding off of the abutment surface 124 of the pawl 125 from the switching cam 123, is effectively compensated for.

If the switch lever 106 is moved only through one-half of its stroke, then the pawl 112 comes to a standstill in front of the switching cam 123 and does not actuate the same. However, the contact 129 abutting elastically at the switching nose portion 113 comes into abutment against the contact strip 130 for the main headlights as a result of the pivoting back of the switching nose portion 113 so that the main headlights are turned on. Upon release of the switching lever 106, the nose portion 113 again lifts the contact 129 off from the contact strip 130.

All of the contact parts as well as shifting cam and control cams are arranged on the assembly plate 119 and may be adjusted prior to the installation into the switch assembly housing.

The switch part 104 in accordance with the present invention may also be controlled electromagnetically and more particularly by means of a conventional relay.

While I have shown and described only two embodiments in accordance with the present invention, it is understood that the present invention is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A switching system, especially for steering column switches of motor vehicles, whose actuating lever is rotatably supported for indicating changes in the driving direction and is pivotally supported at the steering column rotatable housing for purposes of turning on and off the headlights as well as for giving optical signals, the improvement comprising a switch having a switch housing rigidly mounted within the steering column rotatable housing, a switch part provided with at least one elastic switch element, switching cam means actuated by said switch element, a plurality of contact means alternately opened and closed by said switching cam means, additional contact means, said switching part being further provided with a switching nose portion for actuating said additional contact means, and said switching part together with the switch elements and said switch nose portion being made in one piece of elastic material.

2. The combination according to claim 1, wherein said material is a polyamide.

3. The combination according to claim 2, further comprising housing means, means pivotally supporting said switch part near one end in said housing means, said switch elements being of leaf-spring-like construction and extending substantially parallel and in mutually opposite directions in such a manner that the free leg portions of the switch elements extend substantially in the direction of movement of said switch part, the distance of the switch elements from each other being at most equal to the external dimensions of the substantially square shifting cam means.

4. The combination according to claim 3, wherein said distance is smaller than the external dimension of the substantially square shifting cam means.

5. The combination according to claim 3, wherein one of said switch elements forms a switch arm which is provided with said nose portion arranged approximately perpendicularly to the free leg portion thereof, and further contact means, said nose portion being in operative connection with said further contact means.

6. The combination according to claim 5, further comprising an assembly plate structure, control cam means operatively connected with said switching cam means for rotation in unison therewith, and contact strip means for the various contact means, said switching and control cam means as well as the contact means and contact strip means being mounted and adjusted on said plate structure prior to assembly into the housing means.

7. The combination according to claim 1, further comprising housing means, means pivotally supporting said switch part near one end in said housing means, said switch elements being of leaf-spring-like construction and extending substantially parallel and in mutually opposite directions in such a manner that the free leg portions of the switch elements extend substantially in the direction of movement of said switch part, the distance of the switch elements from each other being at most equal to the external dimensions of the substantially square shifting cam means.

8. The combination according to claim 1, wherein one of said switch elements forms a switch arm which is provided with said nose portion arranged approximately perpendicularly to the free leg portion thereof, and further contact means, said nose portion being in operative connection with said further contact means.

9. The combination according to claim 1, further comprising an assembly plate structure, control cam means operatively connected with said switching cam means for rotation in unison therewith, and contact strip means for the various contact means, said switching and control cam means as well as the contact means and contact strip means being mounted and adjusted on said plate structure prior to assembly into the housing.

10. The combination according to claim 2, wherein the elastic switch element is constructed as a single, substantially S-shaped switch arm, a pawl-shaped extension and switching nose portion being formed onto the free end of said switch arm.

11. The combination according to claim 10, wherein said substantially S-shaped switch arm is adapted to be compressed by rotation of said switching cam means, said pawl-shaped extension being provided with an abutment surface, the force stored in the compressed switch arm and the abutment surface of the elastic free leg portion of said switch arm securely holding said switching cam means in its position during return pivot movement of said switch part.

12. The combination according to claim 11, wherein the elastic free leg portion of said switch arm is arranged substantially perpendicularly to its movement and rests with pre-stress on a corresponding abutment surface of the switching cam means.

13. The combination according to claim 12, wherein the switching surface of the pawl-shaped extension has relatively small dimension in relation to the abutment surface thereof.

14. The combination according to claim 13, further comprising raised portions in the contact means facing the control cam means within the contact area of the control cam means.

15. The combination according to claim 14, wherein said raised portions have a substantially flat shape.

16. The combination according to claim 14, wherein said raised portions have a concave shape with the radius thereof corresponding to the radius of the circle described by said control cam means.

17. The combination according to claim 1, wherein the elastic switch element is constructed as a single, substantially S-shaped switch arm, a pawl-shaped extension and switching nose portion being formed onto the free end of said switch arm.

18. The combination according to claim 17, wherein said substantially S-shaped switch arm is adapted to be compressed by rotation of said switching cam means, said pawl-shaped extension being provided with an abutment surface, the force stored in the compressed switch arm and the abutment surface of the elastic free leg portion of said switch arm securely holding said switching cam means in its position during return pivot movement of said switch part.

19. The combination according to claim 17, wherein the elastic free leg portion of said switch arm is arranged substantially perpendicularly to its movement and rests with pre-stress on a corresponding abutment surface of the switching cam means.

20. The combination according to claim 19, wherein the switching surface of the pawl-shaped extension has relatively small dimension in relation to the abutment surface thereof.

21. A switch assembly adapted to be mounted at the steering column of a motor vehicle, comprising: housing means, a one piece switch member, means pivotally supporting said switch member in said housing means near one end thereof, lever means operatively connected with said switch member, a plurality of contact means within said housing means which are adapted to be selectively opened and closed, rotatable means rotatably supported within said housing for opening and closing said contact means including cam means, and said switch member having springy means at the other end for rotating said cam means during pivot movement of said switch member in one direction upon actuation of said lever means.

22. The switch assembly according to claim 21, wherein the springy means includes pawl-like means for rotating said cam means and abutment surface means for holding said cam means securely in the adjusted position.

23. The switch assembly according to claim 22, comprising further contact means, said springy means being provided with a nose portion to close the circuit including said further contact means.

24. The switch assembly according to claim 23, further comprising spring means normally urging said switch member in the direction opposite manual actuation thereof.

25. The switch assembly according to claim 24, wherein said springy means includes two substantially oppositely directed elastic members disposed approximately in the direction of movement of the switch member.

26. The switch assembly according to claim 24, wherein said springy means includes a springy, substantially S-shaped member.

27. The switch assembly according to claim 21, comprising further contact means, said springy means being provided with a nose portion to close the circuit including said further contact means.

28. The switch assembly according to claim 21, wherein said springy means includes two substantially oppositely directed elastic members disposed approximately in the direction of movement of the switch member.

29. The switch assembly according to claim 21, wherein said springy means includes a springy, substantially S-shaped member.

30. The switch assembly according to claim 27, further comprising spring means normally urging said switch member in the direction opposite manual actuation thereof.

31. A switch, comprising: a single one-piece switch part mounted for movement between at least two positions; switching cam means actuated between at least two positions by movement of said part between its two positions; electrical contact means alternately opened and closed by movement of said switching cam means between its two positions; and said single switch part including elastic retainer means resiliently engaging said switching cam means and resiliently retaining said switching cam means in its actuated position.

32. The switch of claim 31, wherein said single switch part is homogeneously constructed in one piece of a synthetic plastic.

33. The switch of claim 31, including additional contact means and said single switch part having nose projection means for directly engaging and actuating said additional contact means upon movement of said switch part between its two positions.

References Cited

UNITED STATES PATENTS

| | | | |
|---|---|---|---|
| 2,800,542 | 7/1957 | Barcus et al. | 200—61.34 |
| 2,820,113 | 1/1958 | Lewis et al. | |
| 2,965,737 | 12/1960 | Lewis et al. | 200—156 |
| 1,685,858 | 10/1928 | Nero | 200—68 |

BERNARD A. GILHEANY, Primary Examiner

H. BROOME, Assistant Examiner